(12) United States Patent
Woodard et al.

(10) Patent No.: US 7,589,525 B2
(45) Date of Patent: Sep. 15, 2009

(54) MAGNETIC FIELD RESPONSE SENSOR FOR CONDUCTIVE MEDIA

(75) Inventors: Stanley E. Woodard, Hampton, VA (US); Bryant D. Taylor, Smithfield, VA (US)

(73) Assignee: The United States of America as represented by the National Aeronautics and Space Administration, Washington, DC (US)

(*) Notice: Subject to any disclaimer, the term of this patent is extended or adjusted under 35 U.S.C. 154(b) by 149 days.

(21) Appl. No.: 11/421,886

(22) Filed: Jun. 2, 2006

(65) Prior Publication Data

US 2007/0013371 A1    Jan. 18, 2007

Related U.S. Application Data

(62) Division of application No. 10/839,448, filed on Apr. 30, 2004, now Pat. No. 7,075,295.

(60) Provisional application No. 60/467,841, filed on May 1, 2003.

(51) Int. Cl.
*G01B 7/14* (2006.01)
*G01N 27/72* (2006.01)
(52) U.S. Cl. .................... 324/239; 324/207.11; 324/244
(58) Field of Classification Search .................. 324/239, 324/244, 260, 207.11, 207.15; 235/439, 235/449, 451; 73/718, 724
See application file for complete search history.

(56) References Cited

U.S. PATENT DOCUMENTS

| 4,490,773 | A | 12/1984 | Moffatt |
| 4,594,640 | A | 6/1986 | Tatsumi |
| 5,075,600 | A | 12/1991 | El-Hamamsy |
| 5,420,757 | A | 5/1995 | Eberhardt |
| 5,423,334 | A | 6/1995 | Jordan |

(Continued)

OTHER PUBLICATIONS

John C. Butler, Anthony J. Vigliotti, Fred W. Verdi, & Shawn M. Walsh, "Wireless, passive, resonant-circuit, inductively coupled, inductive strain sensor," Elsevier, Elsevier Science B.V., p. 63-66, 2002.

(Continued)

*Primary Examiner*—Bot L LeDynh
(74) *Attorney, Agent, or Firm*—Robin W. Edwards

(57) ABSTRACT

A magnetic field response sensor comprises an inductor placed at a fixed separation distance from a conductive surface to address the low RF transmissivity of conductive surfaces. The minimum distance for separation is determined by the sensor response. The inductor should be separated from the conductive surface so that the response amplitude exceeds noise level by a recommended 10 dB. An embodiment for closed cavity measurements comprises a capacitor internal to said cavity and an inductor mounted external to the cavity and at a fixed distance from the cavity's wall. An additional embodiment includes a closed cavity configuration wherein multiple sensors and corresponding antenna are positioned inside the cavity, with the antenna and inductors maintained at a fixed distance from the cavity's wall.

6 Claims, 5 Drawing Sheets

U.S. PATENT DOCUMENTS

| | | | |
|---|---|---|---|
| 5,442,962 A * | 8/1995 | Lee | 73/718 |
| 6,025,735 A | 2/2000 | Gardner et al. | |
| 6,111,520 A | 8/2000 | Allen | |
| 6,278,379 B1 | 8/2001 | Allen | |
| 6,335,690 B1 | 1/2002 | Konchin | |
| 6,463,798 B2 | 10/2002 | Niekerk | |
| 6,532,834 B1 | 3/2003 | Pinto | |
| 6,815,958 B2 | 11/2004 | Kesil | |
| 2001/0001311 A1 | 5/2001 | Park et al. | |
| 2004/0057589 A1 | 3/2004 | Pederson | |
| 2005/0028601 A1 * | 2/2005 | Pedersen et al. | 73/718 |

OTHER PUBLICATIONS

K.G. Ong, C.A. Grimes, C.L. Robbins, & R.S. Singh, "Design and application of a wireless, passive, resonant-circuit environmental monitoring sensor," Elsevier, Elsevier Science B.V., p. 33-43, 2001.

Keat Ghee Ong & Craig A. Grimes, "A resonant printed-circuit sensor for remote query monitoring of environmental parameters," Smart Materials Strut. 9 (2000), p. 421-428.

* cited by examiner

MAGNETIC FIELD RESPONSE SENSOR FOR CONDUCTIVE MEDIA

CLAIM OF BENEFIT OF PROVISIONAL APPLICATION

This application is a divisional application of commonly-owned patent application Ser. No. 10/839,448, filed Apr. 30, 2004, now U.S. Pat. No. 7,075,295, which, pursuant to 35 U.S.C. § 119, claimed the benefit of priority from provisional patent application having U.S. Ser. No. 60/467,841, filed on May 1, 2003.

STATEMENT REGARDING FEDERALLY SPONSORED RESEARCH OR DEVELOPMENT

The invention described herein was made in part by employees of the United States Government and may be manufactured and used by and for the Government of the United States for governmental purposes without the payment of any royalties thereon or therefore.

CROSS-REFERENCE TO RELATED APPLICATIONS

This application is related to co-pending, commonly owned patent application U.S. Ser. No. 10/839,445, filed Apr. 30, 2004, now U.S. Pat. No. 7,086,593, entitled "Magnetic Field Response Measurement Acquisition System."

BACKGROUND OF THE INVENTION

1. Field of the Invention

The present invention relates generally to magnetic field response sensors for conductive media, more specifically conductive surfaces and conductive closed cavities. It relates in particular to a magnetic field response sensor comprising an inductor separated by a fixed distance from the conductive surface. The inductor radiates essentially in open space and transmits information gathered by the capacitive element.

2. Description of the Related Art

A magnetic field response sensor is a passive inductor-capacitive circuit designed to change correspondingly with a change in the physical state that the sensor measures. Use of inductors and capacitors to form resonant circuits is established in the literature. See, for example, D. Halliday and R. Resnick, *Fundamental of Physics*, 2nd Edition, Wiley, N.Y., pp. 624-634 or similar basic physics or electronics texts.

U.S. Pat. No. 4,490,773 (Moffatt) teaches a capacitive pressure transducer that uses a separate inductance and capacitance, with the capacitor and inductor attached to the same framework. Moffatt teaches a method for overcoming the temperature problems associated with such design. U.S. Pat. No. 6,532,834 (Pinto et al.) teaches a capacitive pressure sensor having encapsulated resonating components, wherein the capacitor is located within a housing and the inductor is located outside of the housing. The resonance circuit is electrically coupled to an oscillator.

Metal enclosures have low transmissivity for Radio Frequency (FR) energy and thus present problems for magnetic field response sensors. Proximity to conductive surfaces alters the inductance of magnetic frequency response sensors. As a sensor gets closer to a conductive surface, the magnetic field energy of the sensor is reduced due to eddy currents being induced in the conductive surface. Existing measurement devices do not address the issue of RF transmissivity. It is often desirable to obtain measurements pertaining to conductive surfaces. Examples of closed cavities for which measurements are desired within the cavity include metal fuel tanks and landing gear struts.

SUMMARY OF THE INVENTION

Accordingly, it is an object of the present invention to provide a magnetic field response sensor for acquiring measurements for conductive surfaces.

It is a further object to provide a magnetic field response sensor that addresses the low Radio Frequency (RF) transmissivity of conductive surfaces.

In accordance with the present invention, a magnetic field response sensor comprises an inductor placed at a fixed separation distance from a conductive surface.

DETAILED DESCRIPTION OF THE INVENTION

It is necessary in some applications to have a magnetic field response sensor's capacitor affixed to or embedded in a conductive surface. Magnetic field response sensors are passive inductor-capacitor L-C circuits. The inductor L is placed in parallel with the capacitor C, forming an L-C(p) circuit. An antenna can be used to produce either a broadband time-varying magnetic field or a single harmonic magetic field, with the magnetic field creating an electrical current in the sensor as a result of Faraday induction. The sensor will electrically oscillate at resonant electrical frequencies that are dependent upon the capacitance and inductance of the sensor. The oscillation occurs as the energy is harmonically transferred between the inductor (as magnetic energy) and capacitor (as electrical energy). When the energy is in the inductor, the magnetic fields produced are single harmonic radio frequencies whose frequencies are the sensor's resonant frequencies, and are dependent on how the physical measured property changes the capacitance of the circuit. The antenna can also be used to receive the harmonic magnetic responses produced by the inductors. The receiving antenna can be the same antenna used to produce the initial broadcast of energy received by the L-C circuit or another antenna can be used. When the same antenna is used, it must be switched from a transmitting antenna to a receiving antenna. An example of a magnetic field response system, described in related patent application U.S. Ser. No. 10/839,445, now U.S. Pat. No.

7,086,593, is herein incorporated by reference. The sensor described and claimed herein is suitable for use in the system described in such related application, as well as other magnetic field response systems.

Proximity to conductive surfaces alters the inductance of the sensors. As the sensor gets closer to a conductive surface, the magnetic field energy of the sensor is reduced due to eddy currents being induced in the conductive surface. Therefore, inductors cannot be affixed to or embedded in a conductive surface. It is necessary to have a means of fixed separation. A separation distance of at least 0.375 in was found to be suitable in experimental measurements. The minimum distance for separation is determined by the sensor response. The inductor should be separated from the conductive surface so that the response amplitude exceeds noise level by a recommended 10 dB.

Figure 1:
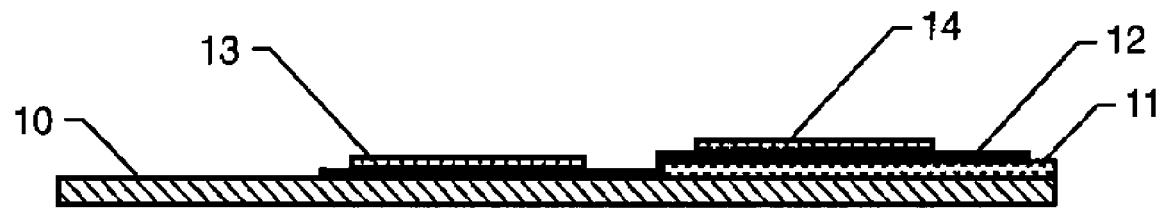
FIG. 1 illustrates an embodiment of a nonconductive spacer used to maintain a fixed separation of an inductor from a conductive surface.
Figure 2:
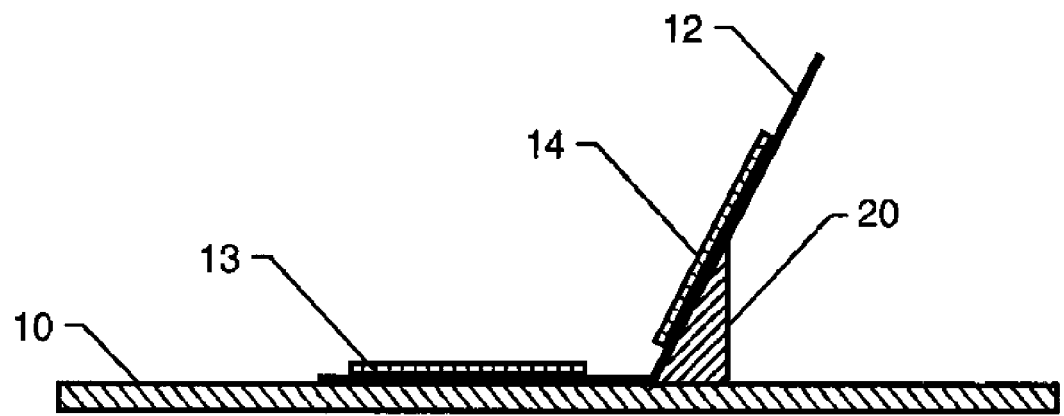
FIG. 2 illustrates an embodiment of a sensor in which an inductor is positioned at a fixed angle away from a conductive surface.

Referring now to the drawings, FIGS. 1 and 2 illustrate embodiments for maintaining constant inductance levels. In FIG. 1, a dielectric nonconductive spacer 11 is used to maintain a fixed separation of the inductor 14 from the conductive surface 10. Nonconductive film 12 and capacitor 13 are also shown. Although the inductance is less than what it would be if it were not in proximity to the conductive surface 10, the inductance is fixed. As long as the inductance is fixed, all variations of the magnetic field response are due to capacitance changes. FIG. 2 illustrates a sensor in which the inductor 14 is positioned at a fixed angle away from the conductive surface 10. A lightweight stiffener 20 is used to maintain the angle. Other suitable means for maintaining the angle may also be used.

Figure 3A:
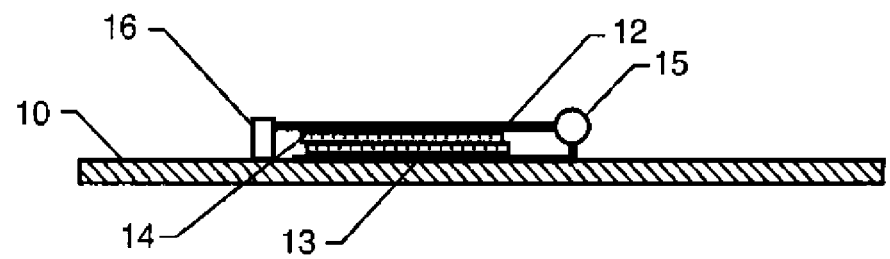
FIG. 3 illustrates an embodiment of a rotational deployable inductor.
Figure 3B:
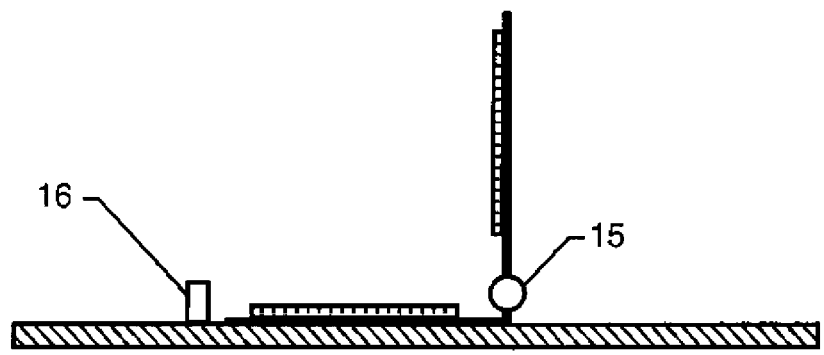
Figure 4A:
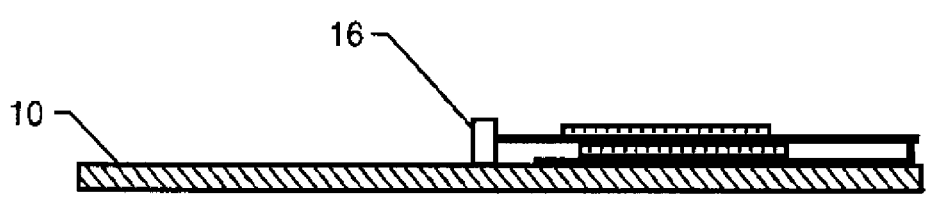
FIG. 4 illustrates an embodiment of a telescopic deployable inductor.
Figure 4B:
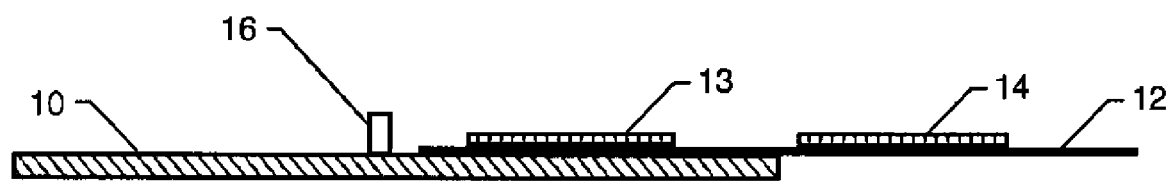

Numerous variations of inductor 14 mounting can be utilized, such as providing a housing that provides separation from the conductive surface 10 as well as protection from impact damage. Systems that have limited space but undergo deployment can have inductors that deploy during deployment of the system and maintain a fixed position after deployment is complete, including both rotational and telescopic deployable inductors. If capacitance is maintained fixed in value, changes in inductance resulting from variation of the separation between inductor and conductive surface can be used to measure proximity to that surface. This variation depends on the surface skin depth. FIGS. 3 and 4 illustrate rotational and telescopic deployable inductors, respectively. FIGS. 3a and 4a show the sensors in their stowed positions. FIGS. 3b and 4b show the sensors in their deployed positions. Latches 16 maintain closure while in the stowed position. Rotational spring 15 deploys the retractable sensor.

Figure 5:
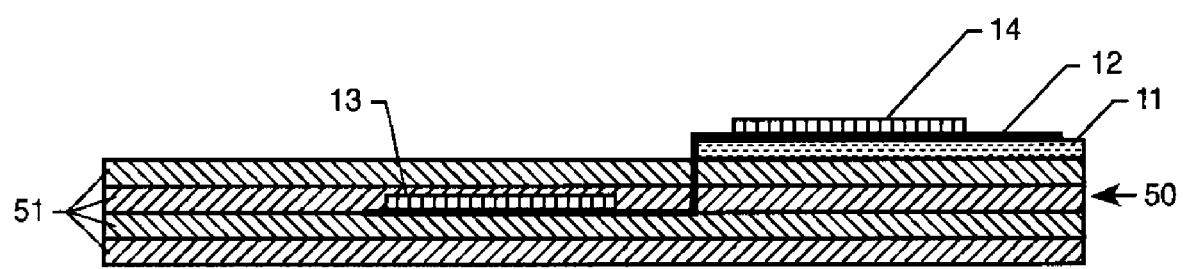
FIG. 5 illustrates an embodiment having a capacitor embedded in a composite material having electrically conductive layers.

FIG. 5 illustrates an embodiment having a capacitor 13 embedded in a composite material 50 having electrically conductive layers 51.

Figure 6:
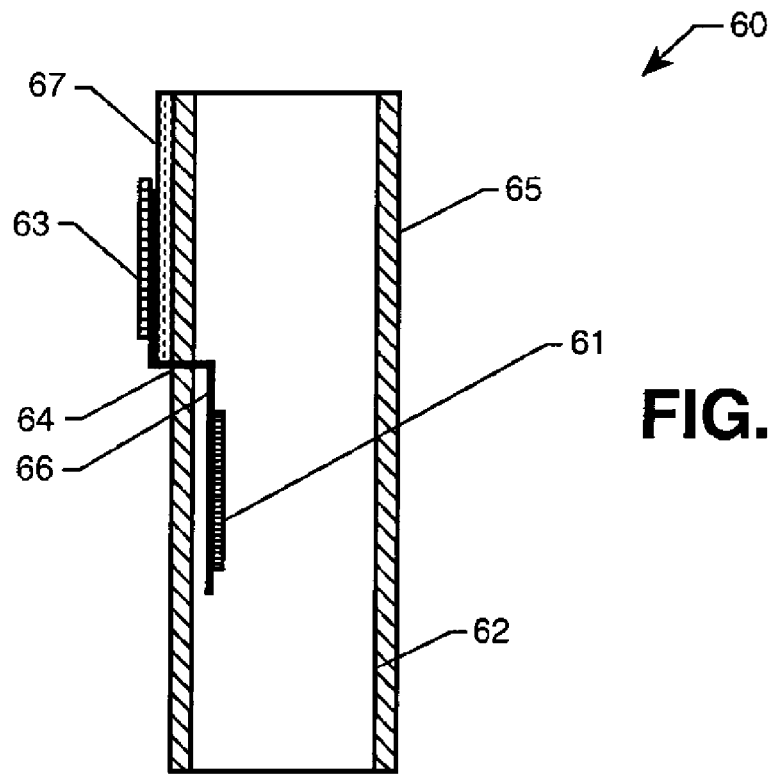
FIG. 6 shows an embodiment of a magnetic field response sensor for closed cavity measurements.
Figure 7:
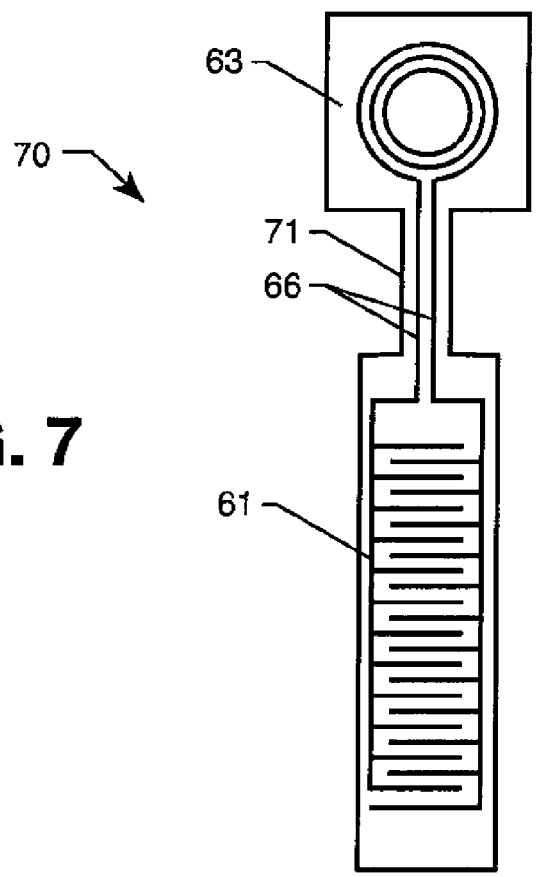
FIG. 7 shows an embodiment of the inductive and capacitive elements for closed cavity measurements.

Referring now to FIGS. 6 and 7, an embodiment of a magnetic field response sensor for closed cavity measurements in accordance with the present invention is shown and referenced generally by numeral 60. A capacitive element 61 of the sensing element 70 is situated in a closed cavity 62 and the inductive element 63 of the sensing element 70 is placed outside of the closed cavity 62. This allows the inductive portion 63 of the sensing element 70 to radiate in essentially open space and transmit the information gathered by the enclosed capacitive element 61. A broadband antenna can broadcast electromagnetic energy within the frequency range of the sensing element 70 and receive the emissions of the sensing element 70, which signals are processed to identify phenomena associated with the sensor.

A narrow throat portion 71 of the sensing element 70 connects the inductor 63 to the capacitor 61. The throat 71 is of sufficient length to allow the capacitor 61 to be appropriately placed within the cavity 62. The inductor 63 is placed outside the cavity 62. The throat 71 is fed through the orifice 64 in the cavity wall 65 that is used to fill the cavity 62 (e.g., fuel tank opening) and connects the inductor 63 and capacitor 61 via electrical leads 66 to form a parallel circuit. Another embodiment is to have the inductor 63 and capacitor 61 fabricated as separate units. In this embodiment, the inductor 63 is mounted external to the cavity 62 and the capacitor 61 is mounted internal to the cavity 62. Electrical leads 66 are fed through the orifice 64 that is used to fill the cavity 62 and connect the inductor 63 and capacitor 61 to form a parallel circuit.

As discussed, the magnetic field produced from an electrically active inductor is eliminated when placed in very close proximity to an electrically conductive material. This means that antennae or inductors cannot be placed on the surface of an electrically conductive material or embedded in an electrically conductive composite materials (e.g., graphite fibers). Additionally, to use a conductive material to support an antenna made from metal foil or metal deposited on a thin film, the antenna must be separated, such as by use of a spacer. The thickness of the spacer is dependent on the amount of field strength that the antenna can lose without losing its ability to acquire its measurement. The same is true for the inductor used in the sensor. If the sensor is placed on a conductive surface, the capacitor can be placed in contact with the surface (a dielectric layer must separate the capacitor and the surface), but the inductor must be separated from the surface via a spacer. Similarly, the capacitor can be embedded within conductive composite layers but the inductor must be placed on the outside and separated.

When the cavity containing the sensor is made of a conductive material and the antenna is external to the cavity, the inductor must also be external to the cavity to allow the sensor to be exposed to the antenna's varying magnetic field. As mentioned above, the inductor must be maintained in a fixed position relative to and separated from the conductive surface.

Figure 8:
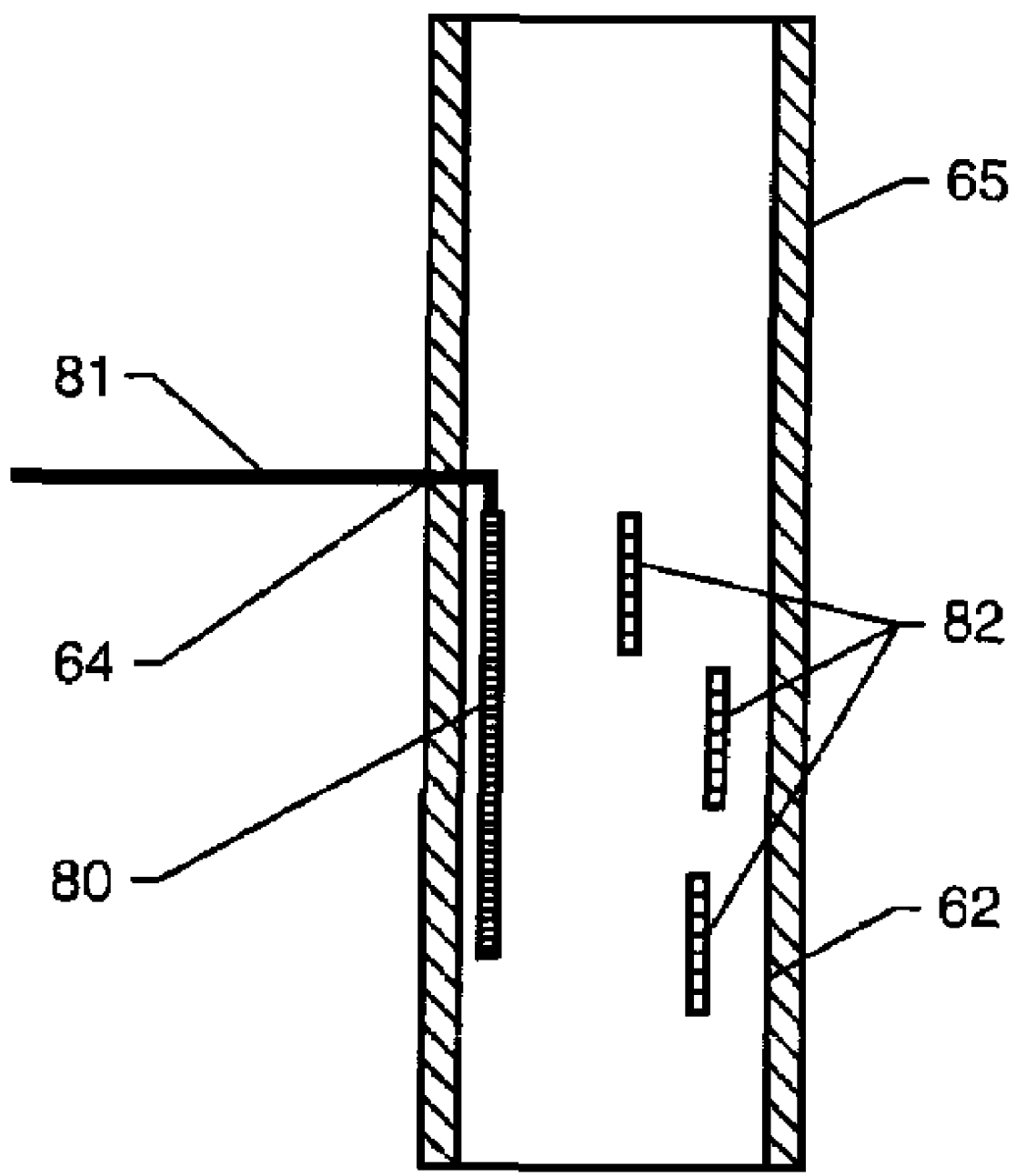
FIG. 8 shows an embodiment of a closed cavity measurements system having multiple sensors and antenna located internal to the cavity.

When a cavity containing multiple sensors is made of a conductive material, an antenna 80 can be placed internal to the cavity 62, as illustrated in FIG. 8. An internal antenna 80 allows all components of the sensors 82 to reside inside the cavity 62. The antenna 80 must be separated from the cavity wall's 65 conductive surface. Additionally, the inductors must be maintained in a fixed position relative to and separated from the cavity wall 65. Antenna leads 81 are fed through an orifice 64 in the cavity wall 65.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetic field response sensor for acquiring physical state measurements within a cavity enclosed by electrically conductive walls, comprising:

an inductive element positioned at a fixed separation distance from an outer surface of said conductive walls; and a capacitive element in operative communication with said inductive element and affixed to an inner surface of said conductive walls, wherein said inductive element is separated from said outer surface such that said inductive element's response amplitude exceeds noise level by about 10 dB.

2. A magnetic field response sensor for closed cavity measurements, comprising:

an inductive element positioned external to said closed cavity and at a fixed separation distance with respect thereto such that said inductive element's response amplitude exceeds noise level by about 10 dB; and a capacitive element in operative communication with said inductive element and positioned internal to said closed cavity, wherein said closed cavity is enclosed by electrically conductive walls.

3. The sensor of claim 2, wherein said fixed separation distance is maintained by a nonconductive layer disposed between said inductive element and said closed cavity.

4. The sensor of claim 2, wherein said fixed separation distance is at least about 0.375 inches.

5. The sensor of claim 2, wherein said inductive element is positioned at a fixed angle from said closed cavity.

6. The sensor of claim 2, further comprising means for effecting movement of said inductive element from a first position to a second position.

* * * * *